United States Patent
Jung et al.

(10) Patent No.: US 12,381,409 B2
(45) Date of Patent: Aug. 5, 2025

(54) METHOD AND DEVICE WITH CHARGING CONTROL

(71) Applicant: Samsung Electronics Co., Ltd., Suwon-si (KR)

(72) Inventors: Daeryong Jung, Seoul (KR); Jinho Kim, Yongin-si (KR); Young Hun Sung, Hwaseong-si (KR); Duk Jin Oh, Seoul (KR); Ju Wan Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 17/574,926

(22) Filed: Jan. 13, 2022

(65) Prior Publication Data

US 2022/0407324 A1 Dec. 22, 2022

(30) Foreign Application Priority Data

Jun. 18, 2021 (KR) ........................ 10-2021-0079309

(51) Int. Cl.
*H02J 7/00* (2006.01)
(52) U.S. Cl.
CPC ........ *H02J 7/0048* (2020.01); *H02J 7/00034* (2020.01); *H02J 7/00712* (2020.01)
(58) Field of Classification Search
CPC ...... H02J 7/0048; H02J 7/0034; G01R 31/392
See application file for complete search history.

(56) References Cited

U.S. PATENT DOCUMENTS

| 2020/0136173 A1 | 4/2020 | Hong et al. |
| 2020/0335993 A1 | 10/2020 | Jung et al. |
| 2021/0066945 A1 | 3/2021 | Jung et al. |

FOREIGN PATENT DOCUMENTS

| CN | 102124360 A | 7/2011 |
| JP | 2009-17752 A | 1/2009 |
| JP | 2018-64413 A | 4/2018 |
| JP | 2020-68550 A | 4/2020 |
| KR | 10-2141268 B1 | 8/2020 |

OTHER PUBLICATIONS

Extended European search report issued on Jul. 25, 2022, in counterpart European Patent Application No. 22154320.0 (9 pages in English).
Chinese Office Action issued on Jun. 11, 2025, in corresponding Chinese Patent Application No. 202210120513.0. (13pages in English, 7pages in Chinese).

*Primary Examiner* — Lam S Nguyen
(74) *Attorney, Agent, or Firm* — NSIP Law

(57) ABSTRACT

A processor-implemented method with charging control includes: estimating respective step degradation amounts in charging steps of a first charging interval for each of first candidate current patterns of charging a battery from a first state of charge (SOC) level to a second SOC level during the first charging interval; determining an interval degradation amount in the first charging interval for each of the first candidate current patterns, based on the estimated step degradation amounts; and selecting a first representative current pattern indicating a minimum degradation amount from among the first candidate current patterns, based on the determined interval degradation amounts.

27 Claims, 12 Drawing Sheets

METHOD AND DEVICE WITH CHARGING CONTROL

CROSS-REFERENCE TO RELATED APPLICATIONS

This application claims the benefit under 35 USC § 119(a) of Korean Patent Application No. 10-2021-0079309 filed on Jun. 18, 2021, in the Korean Intellectual Property Office, the entire disclosure of which is incorporated herein by reference for all purposes.

BACKGROUND

1. Field

The following description relates to a method and device with charging control.

2. Description of Related Art

A constant current-constant voltage (CC-CV) charging method may charge a battery until it reaches a preset low current value after charging the battery up to a certain voltage with a constant current. A multi-step charging method that may charge a battery in multiple steps while changing a charging current value. The multi-step charging method may minimize battery degradation in the case of fast charging. For the multi-step charging method, a battery state may be estimated, and the battery state may be estimated using various methods. For example, the battery state may be estimated using a battery simulation model, for example, an electric circuit model or an electrochemical model. The electric circuit model may be a circuit model including resistors and capacitors representing a voltage value that varies as a battery is charged or discharged. The electrochemical model may be a model that models internal physical phenomena of a battery, such as, for example, a battery ion concentration, a potential, and the like.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method with charging control includes: estimating respective step degradation amounts in charging steps of a first charging interval for each of first candidate current patterns of charging a battery from a first state of charge (SOC) level to a second SOC level during the first charging interval; determining an interval degradation amount in the first charging interval for each of the first candidate current patterns, based on the estimated step degradation amounts; and selecting a first representative current pattern indicating a minimum degradation amount from among the first candidate current patterns, based on the determined interval degradation amounts.

The first candidate current patterns may correspond to different combinations of charging current values respectively for the charging steps of the first charging interval.

The estimating of the step degradation amounts may include estimating the step degradation amounts in the charging steps for each of the first candidate current patterns using a simulation model of the battery, and the determining of the interval degradation amounts may include determining an interval degradation amount of each of the first candidate current patterns by accumulating the step degradation amounts of each of the first candidate current patterns in the first charging interval.

The first charging interval may include a first charging step and a second charging step, and the first candidate current patterns may include a first pattern of applying a first current value during the first charging step and applying a second current value during the second charging step.

The estimating of the step degradation amounts may include: estimating a first step degradation amount of the first pattern based on the first current value; and estimating a second step degradation amount of the first pattern based on the second current value, and the determining of the interval degradation amounts may include determining a first interval degradation amount of the first pattern by accumulating the first step degradation amount and the second degradation amount.

The simulation model may be an electrochemical model.

The method may include removing data associated with remaining current patterns excluding the first representative current pattern from among the first candidate current patterns.

The method may include selecting a second representative current pattern of charging the battery from the second SOC level to a third SOC level during a second charging interval, based on the first representative current pattern.

A battery state value that is based on the first representative current pattern may be used to determine second candidate current patterns for the second charging interval and determine an interval degradation amount of each of the second candidate current patterns.

In the determining of the second candidate current patterns, remaining first current patterns excluding the first representative current pattern from among the first candidate current patterns may be excluded.

The step degradation amounts in the charging steps for each of the first candidate current patterns may be estimated using a simulation model of the battery, and the simulation model may be updated based on a degradation state of the battery.

The method may include: determining a reference dataset based on the first representative current pattern; and controlling charging in each charging step for the battery based on the determined reference dataset.

The controlling of the charging may include: estimating an internal state of the battery using a simulation model of the battery; and controlling a charging current based on the reference dataset and the internal state.

The method may include updating the reference dataset based on a degradation state of the battery.

In another general aspect, one or more embodiments include a non-transitory computer-readable storage medium storing instructions that, when executed by a processor, configure the processor to perform any one, any combination, or all operations and methods described herein.

In another general aspect, a device with charging control includes: a processor configured to: estimate respective step degradation amounts in charging steps of a first charging interval for each of first candidate current patterns of charging a battery from a first state of charge (SOC) level to a second SOC level during the first charging interval; determine an interval degradation amount in the first charging interval for each of the first candidate current patterns, based on the estimated step degradation amounts; and select a first representative current pattern indicating a minimum degradation amount from among the first candidate current patterns, based on the determined interval degradation amounts.

The first candidate current patterns may correspond to different combinations of charging current values respectively for the charging steps of the first charging interval.

The processor may be configured to: for the estimating of the step degradation amounts, estimate the step degradation amounts in the charging steps for each of the first candidate current patterns, using a simulation model of the battery; and for the determining of the interval degradation amounts, determine the interval degradation amount of each of the first candidate current patterns by accumulating the step degradation amounts of each of the first candidate current patterns in the first charging interval.

The processor may be configured to select a second representative current pattern of charging the battery from the second SOC level to a third SOC level during a second charging interval, based on the first representative current pattern, and a battery state value that is based on the first representative current pattern may be used to determine second candidate current patterns for the second charging interval and determine an interval degradation amount of each of the second candidate current patterns.

In the determining of the second candidate current patterns, remaining current patterns excluding the first representative current pattern from among the first candidate current patterns may be excluded.

The device may include a memory storing instructions that, when executed by the processor, configure the processor to perform the estimating of the respective step degradation amounts, the determining of the interval degradation amount, and the selecting of the first representative current pattern.

In another general aspect, a processor-implemented method with charging control includes: estimating, for charging a battery from a first state of charge (SOC) to a second SOC over a first charging interval, battery degradation amounts each corresponding to a respective candidate current pattern; determining, as a current pattern of the first interval, one of the candidate current patterns corresponding to a minimum of the battery degradation amounts; and determining, for charging the battery from the first SOC to a third SOC over a plurality of charging intervals including the first interval, a final current pattern to include the determined current pattern of the first interval.

The determining of the final current pattern may include estimating a current pattern of a subsequent charging interval based on the determined current pattern of the first interval.

The determining of the current pattern of the first interval may include deleting the candidate current patterns from a memory except for the determined current pattern of the first interval.

Each of the current patterns for the first charging interval may be a pattern of charging the battery based on two or more charging currents over the first charging interval.

The first charging interval may include a plurality of charging steps, and two or more of the candidate current patterns may include different charging currents for one or more of the charging steps.

The method may include charging the battery based on the final charging current pattern.

Other features and aspects will be apparent from the following detailed description, the drawings, and the claims.

Figure 1:
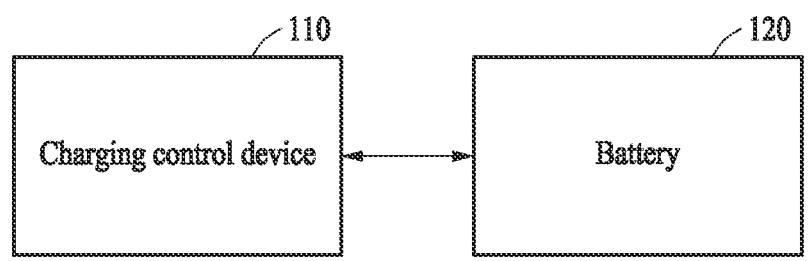
FIG. 1 illustrates an example of a charging control device and an example of a battery.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a charging control device and an example of a battery. Referring to FIG. 1, a charging control device 110 may control charging of a battery 120. The charging control device 110 may generate a reference dataset for charging the battery 120 and/or control the charging of the battery 120 based on the reference dataset. In a non-limiting example, the charging control device 110 includes the battery 120.

The charging control device 110 may use a multi-step charging method. The reference dataset may include control parameters for multi-step charging. For example, the reference dataset may include a charging limit condition and a charging current value for each charging step and may be provided in the form of a lookup table (LUT). The charging limit condition may include conditions associated with a negative electrode potential, a cell voltage, a state of charge (SOC), a positive electrode potential, a positive electrode lithium concentration, a negative electrode lithium concentration, and/or the like. For example, in one charging step, the battery 120 may be charged with a charging current value of the charging step. When the charging limit condition of the charging step is satisfied, the battery 120 may be charged with a charging current value of a subsequent charging step.

The charging control device 110 may derive a charging current sequence that minimizes degradation of the battery 120, while satisfying a given charging target, for example, to charge the battery 120 from an SOC level of 0% to 50% for ten minutes, to charge the battery 120 from an SOC level of 0% to 80% for 30 minutes, and the like. The charging control device 110 may detect a pattern indicating a minimum degradation amount among various current patterns that may be derived by combining charging current values for each step. The charging control device 110 may calculate respective step degradation amounts in charging steps for each current pattern, accumulate the step degradation amounts of each current pattern, and estimate a degradation effect of each current pattern.

The charging control device 110 may estimate a state (e.g., an SOC, an internal state, a degradation state, etc.) of the battery 120 in various ways. The charging control device 110 may use a simulation model, such as, for example, an electrochemical thermal (ECT) model. Although a non-limiting example of controlling charging using the ECT model will be described hereinafter, this is provided merely as an example. For example, other methods such as a current integration method and a method using another simulation model such as an electric circuit model may be used.

The ECT model may be a model that models an internal physical phenomenon of a battery, for example, a battery ion concentration, a potential, and the like. The ECT model may simulate an internal state of the battery 120 using various ECT parameters and governing equations. For example, such parameters of the ECT model may indicate a shape (e.g., a thickness, a radius, etc.), an open circuit potential (OCP), and physical properties (e.g., an electrical conductivity, an ionic conductivity, a diffusion coefficient, etc.). The governing equations may include an electrochemical reaction occurring between an electrode and an interface of an electrolyte based on these parameters, a physical conservation equation associated with the electrode, a concentration of the electrolyte, and conservation of electrical charges. The charging control device 110 may estimate a state and/or a degradation amount of the battery 120 based on operation data (e.g., a voltage, a current, a temperature, etc.) and the ECT model of the battery 120.

As the battery 120 continues operating, a cell of the battery 120 may be degraded and a state of the cell may thereby change. Such a change in the cell state may reduce the accuracy in SOC estimation performed using the ECT model. The charging control device 110 may update the ECT model based on a degradation state of the battery 120 to maintain or increase the accuracy in the estimation. The updating of the ECT model may include updating the parameters of the ECT model. The charging control device 110 may update the reference dataset using the updated ECT model to maintain a charging current pattern to be in an optimal state.

Figure 2:
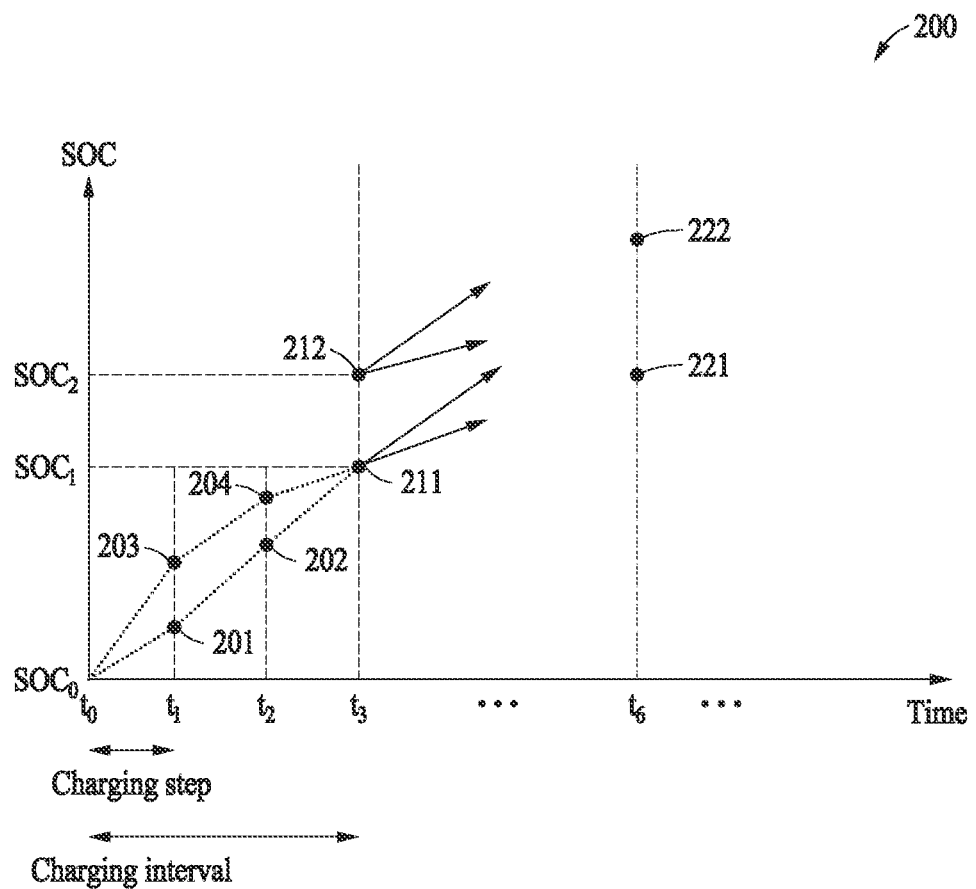
FIG. 2 illustrates an example of multi-step charging.

FIG. 2 illustrates an example of multi-step charging. Referring to FIG. 2, a charging profile 200 may include a plurality of charging points 201 through 222. The charging points 201 through 222 may indicate specific SOC levels at specific times. For example, the charging point 211 may indicate an SOC level $SOC_1$ at a time $t_3$, and the charging point 212 may indicate an SOC level $SOC_2$ at the time $t_3$.

Through battery charging, an SOC of a battery may reach the charging points 201 through 222.

A path to reach each of the charging points 201 through 222 may vary depending on a charging current value. For example, a path from a starting point to the charging point 211 may include a first path through the charging points 201 and 202 and a second path through the charging points 203 and 204. When a current value increases, a slope of a path, that is, an SOC change amount based on a time (e.g., an SOC rate of change), may increase. For example, a charging current value of a path from the starting point to the charging point 203 may be greater than a charging current value of a path from the starting point to the charging point 201. Each path may form a current pattern based on a sequence of charging current values.

A charging control device may search for an optimal path based on a charging step corresponding to a unit time. A charging step may be divided by an interval between times adjacent to each other, for example, $t_0$ and $t_1$. The charging control device may set a charging current value for each charging step as a unit. For example, the charging control device may determine a charging path by setting a first charging current value for a first charging step and setting a second charging current value for a second charging step. In this example, the first charging current value and the second charging current value may be the same value or different values.

The charging control device may determine an optimal path for each charging interval. One or more charging steps may constitute a single charging interval. In other words, a charging interval may include one or more charging steps. In the example of FIG. 2, one charging interval may include three charging steps. However, examples are not limited to the example of FIG. 2. For example, one charging interval may include two charging steps or four or more charging steps. In addition, all charging intervals may include the same number of charging steps, or at least a portion of the charging intervals may include different numbers of charging steps. For example, the charging control device may set first three charging steps $t_0$ through $t_3$ as an initial charging interval, and set an optimal path for each of the final charging points 211 and 212 of the initial charging interval. Subsequently, the charging control device may set a charging interval for each charging steps (e.g., $t_3$-$t_4$, $t_4$-$t_5$, $t_5$-$t_6$, ...) and determine an optimal path for each charging interval. For another example, the charging control device may set three charging steps (e.g., $t_0$-$t_3$, $t_4$-$t_6$, $t_7$-$t_9$, ...) as a charging interval.

The charging control device may derive a final path to a final target point, for example, 80% charging for 30 minutes, while partially searching for an optimal path for each charging interval. The charging control device may estimate an SOC and a charging path while adjusting a simulation condition (for example, a charging current value and a charging time or charging step) of a battery simulation model. In addition, the charging control device may determine a degradation amount of each path based on a battery state using the simulation model. The charging control device may search for an optimal path based on the degradation amount.

The charging control device may determine various current patterns based on a charging current value, and determine, to be a representative current pattern (or an optimal current pattern) at a charging point, a current pattern that indicates a minimum degradation amount from among current patterns reaching the charging point. For example, when a first current pattern passing through the charging points 201 and 202 and a second current pattern passing through the charging points 203 and 204 are present for the charging point 211, the current pattern among the first current pattern and the second current pattern that indicates a lower degradation amount between the first current pattern and the second current pattern may be determined to be a representative current pattern for the charging point 211. A representative current pattern for the charging point 212 may also be determined in a similar way as the foregoing.

When the representative current pattern for each charging point is determined, the charging control device may remove data associate with remaining current patterns excluding the representative current pattern. For example, the charging control device may delete the data associated with the remaining current patterns from a memory. To determine current patterns for subsequent target points, for example, the charging points 221 and 222, the charging control device may calculate a degradation amount from the previous charging points 211 and 212 based on representative current patterns of the previous charging points 211 and 212. The number of cases according to different current patterns of the previous charging points 211 and 212 (e.g., the remaining current patterns that are not the representative current patterns) may not be used to determine the current patterns for the subsequent charging points 221 and 222. Accordingly, the charging control device of one or more embodiments may reduce the amount of calculation and improve memory efficiency.

Figure 3:
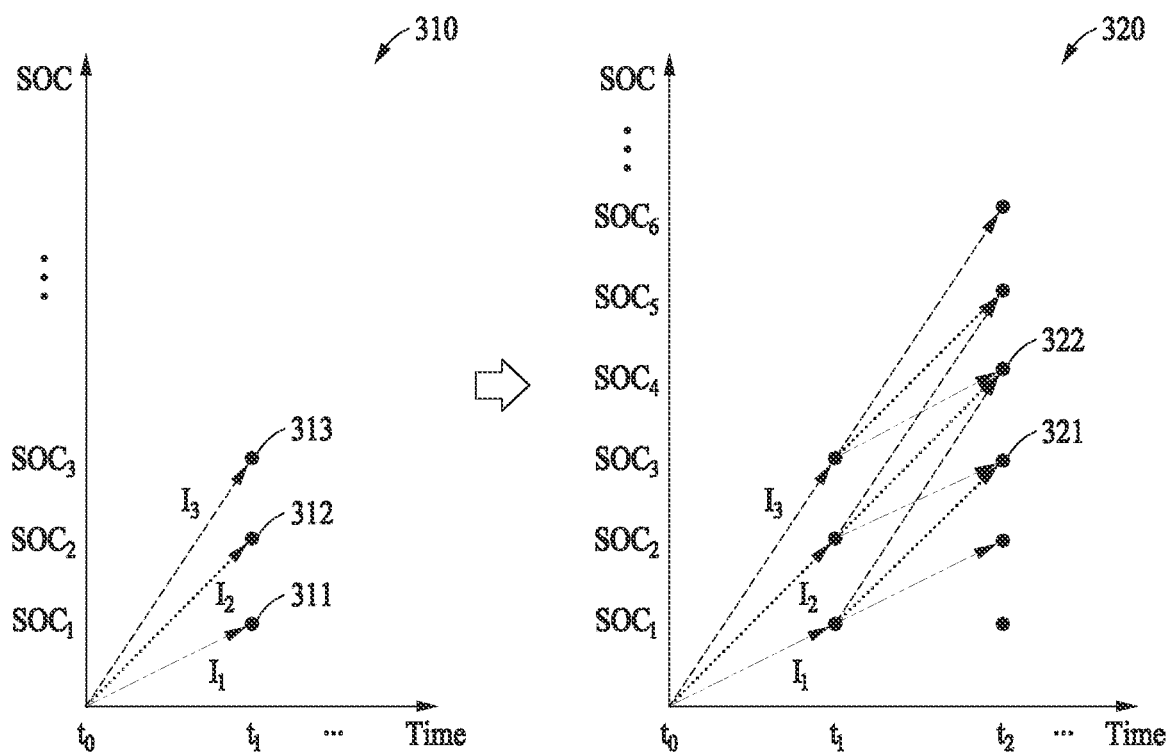
FIG. 3 illustrates an example of deriving candidate current patterns by combining charging currents for each charging step.

FIG. 3 illustrates an example of deriving candidate current patterns by combining charging currents for each charging step. Referring to FIG. 3, a plurality of charging points 311, 312, and 313 may be defined based on a time $t_1$ by referring to a charging profile 310. A period between a time $t_0$ and a time $t_1$ may correspond to a first charging step. For example, each charging step may correspond to an amount of time (for example, 30 seconds, one minute, or three minutes). The charging point 311 may indicate a state in which an SOC level of a battery reaches $SOC_1$ at the time $t_1$ when a first charging current $I_1$ is applied to the battery during the first charging step between $t_0$ and $t_1$. The charging point 312 may indicate a state in which the SOC level of the battery reaches $SOC_2$ at the time $t_1$ when a second charging current $I_2$ is applied to the battery during the first charging step between $t_0$ and $t_1$. The charging point 313 may indicate a state in which the SOC level of the battery reaches $SOC_3$ at the time $t_1$ when a third charging current $I_3$ is applied to the battery during the first charging step between $t_0$ and $t_1$. As a current value increases, a slope of a path (that is, an SOC change amount based on a time) may increase. For example, when $I_2$ is greater than $I_1$ by a factor of 2 times and $I_3$ is greater than $I_1$ by a factor of 3 times, $SOC_2$ may be greater than $SOC_1$ by a factor of 2 times and $SOC_3$ may be greater than $SOC_1$ by a factor of 3 times.

Referring to the charging profile 320, a plurality of charging points may be defined at a time $t_2$ based on $I_1$ through $I_3$. For example, a charging point 321 may be determined by applying $I_2$ to the charging point 311 or applying $I_1$ to the charging point 312, and a charging point 322 may be determined by applying $I_2$ to the charging point 312 or applying $I_1$ to the charging point 313. As described above, charging points may be determined for each charging step based on charging current values. For example, a charging current may have current values at intervals of 0.1 C from 1 C to 1.8 C (however, examples are not limited thereto, and the current values may be measured in any unit of current such as amperes A). In this example, nine charging points may be defined at the time $t_1$, dissimilar to the foregoing example.

A charging control device may determine various charging paths that pass through charging points (for example, the charging points 311 through 322) while changing a charging current value for each charging step. These charging paths may respectively correspond to current patterns. The current patterns may correspond to different combinations of charging current values for charging steps of a charging interval. For example, charging paths to the charging point 321 may correspond to current patterns [$I_1$ $I_2$] and [$I_2$ $I_1$], and charging paths to the charging point 322 may correspond to current patterns [$I_3$ $I_1$], [$I_2$ $I_2$], and [$I_1$ $I_3$]. The charging control device may determine a degradation amount of each current pattern, and determine an optimal current pattern based on the determined degradation amount. Herein, a candidate for selecting an optimal current pattern may be referred to as a candidate current pattern, and the optimal current pattern may be referred to as a representative current pattern.

Figure 4A:
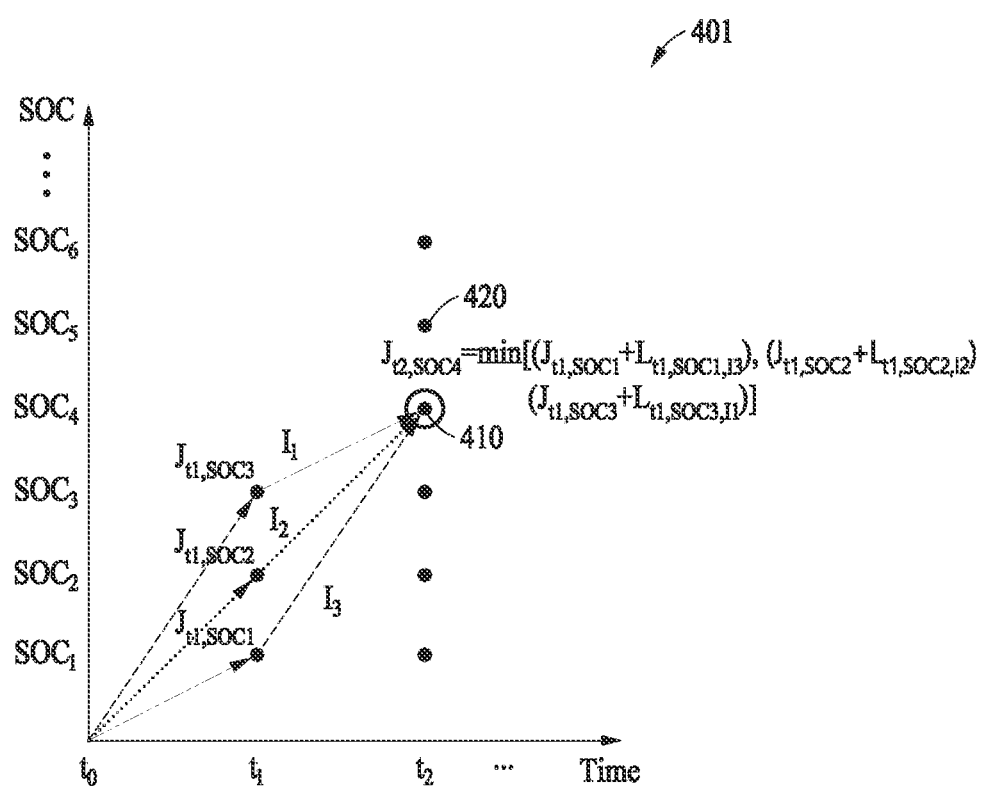
FIGS. 4A and 4B illustrate examples of determining a step degradation amount and an interval degradation amount.
Figure 4B:
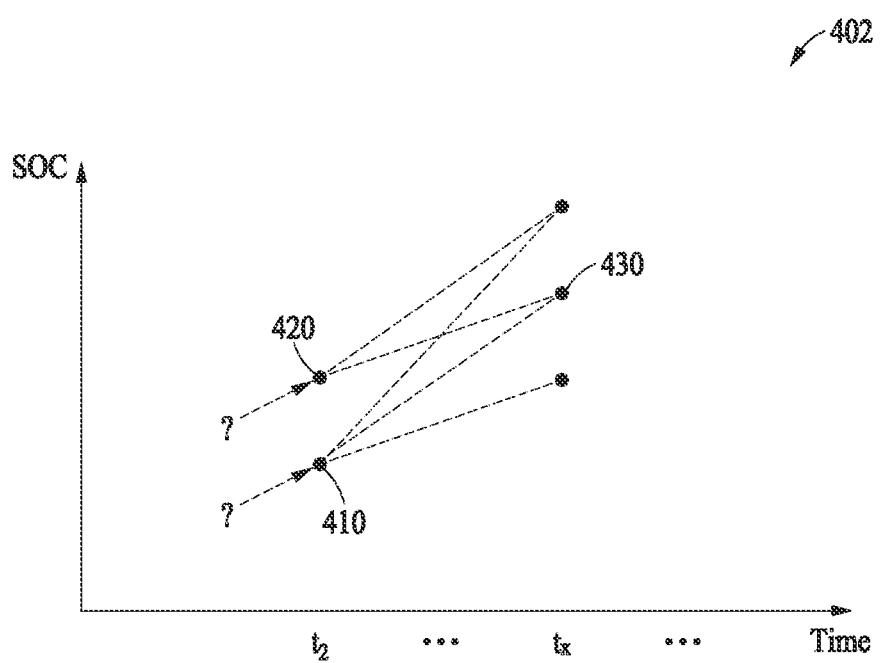

FIGS. 4A and 4B illustrate examples of determining a step degradation amount and an interval degradation amount. FIG. 4A illustrates an example of an operation in an interval from a time $t_0$ to a time $t_2$. A charging control device may determine step degradation amounts of each candidate current pattern. A step degradation amount described herein may indicate an amount of degradation represented in a unit of a charging step. In addition, an interval degradation amount described herein may indicate an amount of degradation represented in a unit of a charging interval. The charging control device may determine the step degradation amounts of each candidate current pattern based on an internal state of a battery that is estimated using a simulation model. For example, as illustrated in a charging profile 401, the charging control device may estimate step degradation amounts in a first charging step from $t_0$ to $t_1$ from respective applications of $I_1$, $I_2$, and $I_3$ for charging points of the time $t_1$, and estimate step degradation amounts in a second charging step from $t_1$ to $t_2$ from respective applications of $I_1$, $I_2$, and $I_3$ for charging points of the time $t_2$.

The charging control device may determine an interval degradation amount of each candidate current pattern by accumulating, along a charging interval, the step degradation amounts of each candidate current pattern, and determine a representative current pattern for each charging point based on the interval degradation amount of each candidate current pattern. For example, as illustrated in FIG. 4A, the first charging step from $t_0$ to $t_1$ and the second charging step from $t_1$ to $t_2$ may constitute an initial charging interval, and the charging control device may determine representative current patterns for charging points of $t_2$ based on an interval degradation amount of each candidate current pattern in the initial charging interval. Although the following description will focus on the non-limiting example in which two charging steps constitute an initial charging interval, three or more charging steps may constitute one charging interval.

Charging paths leading to a charging point 410 may include a first current pattern [$I_1$ $I_3$], a second current pattern [$I_2$ $I_2$], and a third current pattern [$I_3$ $I_1$]. The charging control device may determine an interval degradation amount of the first current pattern by accumulating a step degradation amount based on application of $I_1$ during the first charging step from $t_0$ to $t_1$ and a step degradation amount based on application of $I_3$ during the second charging step from $t_1$ to $t_2$. Similarly, the charging control device may determine an interval degradation amount of the second current pattern and an interval degradation amount of the third current pattern. The determined interval degradation amounts may be represented as $J_{t1,SOC1}+L_{t1,SOC1,I3}$, $J_{t1,SOC2}+L_{t1,SOC2,I2}$, and $J_{t1,SOC3}+L_{t1,SOC3,I1}$. $J_{t1,SOC1}$, $J_{t1,SOC2}$, and $J_{t1,SOC3}$ may represent the step degradation amounts in the first charging step from $t_0$ to $t_1$. $L_{t1,SOC1,I3}$, $L_{t1,SOC2,I2}$, and $L_{t1,SOC3,I1}$ may represent the step degradation amounts in the second charging step from $t_1$ to $t_2$. For example, $J_{t1,SOC1}$ may represent a step degradation amount as the battery at an initial point reaches a charging point ($t_1$, $SOC_1$), and $L_{t1,SOC1,I3}$ may represent a step degradation amount as a charging current value $I_3$ is applied to the battery at the charging point ($t_1$, $SOC_1$). When a starting point is different even with the same charging current value, different step degradation amounts may be exhibited, and L may thus include information about the starting point.

In one example, the charging control device may derive a degradation amount based on Equation 1 below, for example.

$$j_{side}^{Li} = a_s i_{0,side}\left[\exp\left(\frac{\alpha_{a,side} n_{side} F}{RT}\eta_{side}\right) - \exp\left(-\frac{\alpha_{c,side} n_{side} F}{RT}\eta_{side}\right)\right] \quad \text{Equation 1}$$

Based on Equation 1, a side reaction current based on an internal state of a battery may be calculated. A side reaction may be considered as corresponding to degradation of the battery, and thus a degradation amount may be derived from the side reaction current that indicates an amount of the side reaction occurring per unit time. In Equation 1 above, $j_{side}^{Li}$ denotes an anode side reaction current. $\eta_{side}$ denotes an anode overpotential with respect to a side reaction. R denotes an ideal gas constant, and T denotes a temperature. $\alpha_{a,side}$ and $\alpha_{c,side}$ denote charge transfer coefficients with respect to reduction-oxidation. $n_{side}F$ denotes a quantity of electrical charges of a side reaction, and $a_s$ denotes an active surface area of an anode. $i_{0,side}$ denotes an exchange current density with respect to an anode side reaction. $i_{0,side}$ may be represented as Equation 2 below, for example.

$$i_{0,side} = k_{side}\sqrt{c_{s,surf} c_{EC,R_s}} \quad \text{Equation 2:}$$

In Equation 2 above, $c_{s,surf}$ denotes a lithium concentration of an electrode surface. $c_{EC,Rs}$ denotes an electrolyte concentration of the electrode surface, and $k_{side}$ denotes a kinetic rate constant with respect to a side reaction. A remaining portion excluding $c_{s,surf}$ in Equation 2 may be represented by $k_{eff}$, which may correspond to a degradation rate coefficient. In a case of calculating and comparing degradation amounts for respective charging control conditions in a certain degradation state, $k_{eff}$ may be assumed to be the same and thus be disregarded. When $k_{eff}$ is derived, a degradation amount may be calculated inversely from Equation 1. The charging control device may estimate an internal state of a battery through a simulation model (for example, an ECT model) and derive a side reaction current from the internal state by applying a value of the estimated internal state to Equation 1. For example, parameter values such as $\eta_{side}$, T, and $c_{s,surf}$ may be determined through the simulation model. The side reaction current may correspond to each step degradation amount.

The charging control device may determine a candidate current pattern indicating a minimum interval degradation amount to be a representative current pattern for the charging point 410. A degradation amount at the charging point 410 based on the representative current pattern may be represented as $\min[(J_{t1,SOC1}+L_{t1,SOC1,t3}), (J_{t1,SOC2}+L_{t1,SOC2,t2}), (J_{t1,SOC3}+L_{t1,SOC3,t1})]$. The charging control device may determine a representative current pattern for another charging point of $t_2$ such as a charging point 420 in a similar way described above.

FIG. 4B illustrates an example of an operation after $t_2$. When representative current patterns of respective charging points of a certain charging interval are determined, remaining candidate current patterns excluding the representative current patterns may be excluded to determine a current pattern for a subsequent charging interval. The remaining candidate current patterns may be deleted from a memory. For example, candidate current patterns of charging points 430 of $t_x$ may be determined based on representative current patterns of the charging points 410 and 420. In this example, remaining candidate current patterns of the charging points 410 and 420 may be excluded. In this example, x may have various values. When an interval degradation amount is calculated for each charging step and a representative current pattern is derived for each charging step, x may be 3 (x=3). When a degradation amount is calculated for every two charging steps and a representative current pattern is derived for every two charging steps, x may be 4 (x=4).

The charging control device may derive a final current pattern that reaches a final target point (for example, charging a battery from an SOC level of 0% to 50% for 10 minutes, charging a battery from an SOC level of 0% to 80% for 30 minutes, and the like) while searching for, or determining, a representative current pattern for each charging interval. The charging control device may determine a reference dataset based on the final current pattern. The reference dataset may include a charging limit condition and a charging current value for each charging step. The charging control device may charge the battery based on the reference dataset, and update and use the reference dataset in a situation such as when the battery is degraded.

Figure 5:
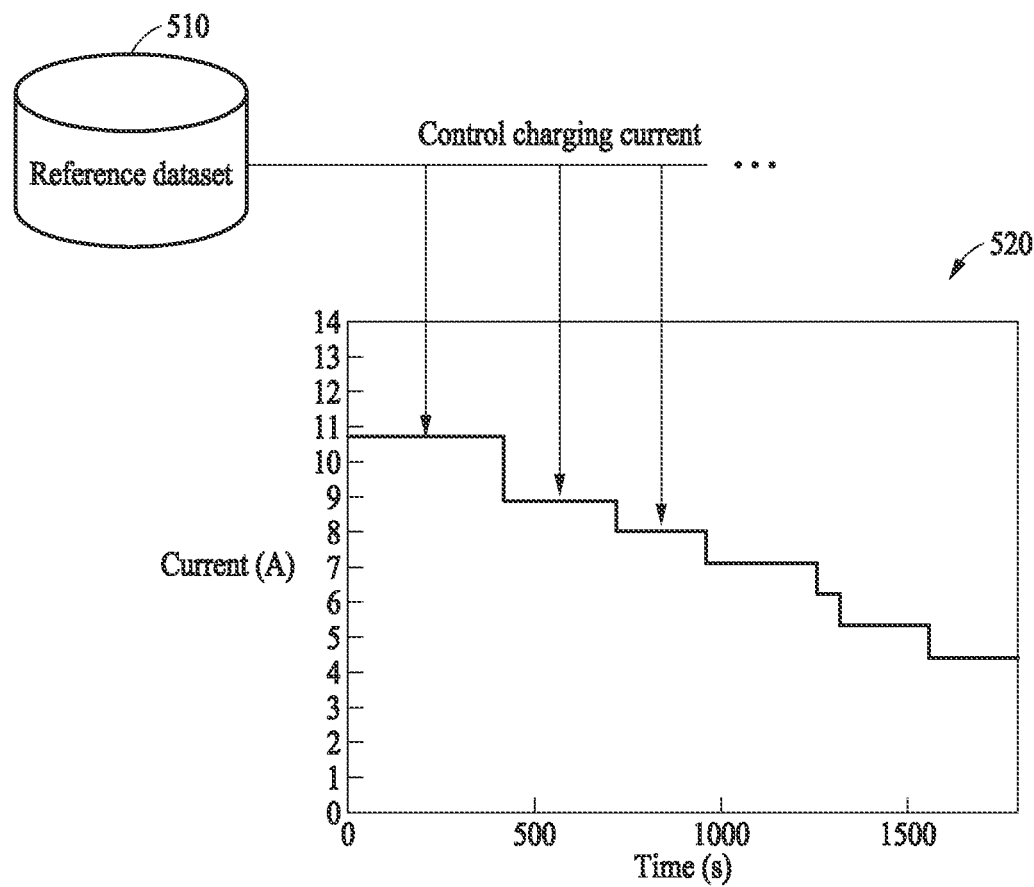
FIG. 5 illustrates an example of controlling a charging current based on a reference dataset.

FIG. 5 illustrates an example of controlling a charging current based on a reference dataset. Referring to FIG. 5, a charging control device may control charging in each charging step of a battery based on a reference dataset 510. For example, the charging control device may adjust a charging current in each charging step based on the reference dataset 510. A charging profile 520 may represent a change in charging current based on a lapse of a charging time. The charging control device may charge the battery with a charging current value matched to each charging step based on the reference dataset 510. When a charging limit condition for each charging step is satisfied, the battery may be charged with a charging current value matched to a subsequent charging step.

When charging is repeated, the battery may be degraded. In addition, fast charging may accelerate such degradation. Charging or fast charging based on the reference dataset 510 of one or more embodiments may greatly reduce a rate at which degradation progresses, compared to charging or fast charging based on a typical current pattern. Such a rate difference may increase further as the number of repetitions of a charging and discharging cycle increases.

Figure 6:
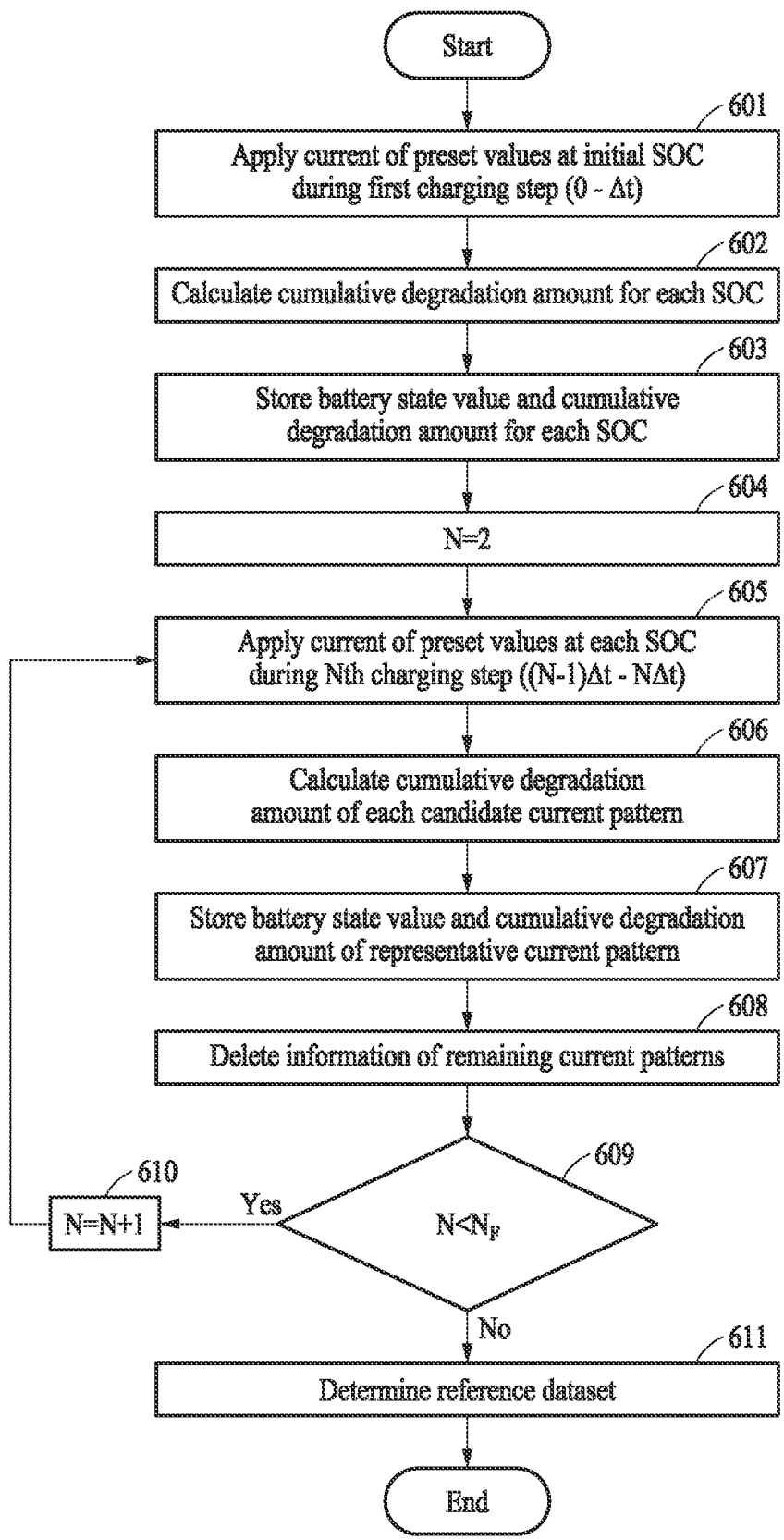
FIG. 6 illustrates an example of deriving a reference dataset while increasing a charging step.

FIG. 6 illustrates an example of deriving a reference dataset while increasing a charging step. Operations 601 through 611 to be described hereinafter with reference to FIG. 6 may be performed sequentially or non-sequentially. For example, the sequence of operations 601 through 611 may be changed and/or at least two of operations 601 through 611 may be performed in parallel.

Referring to FIG. 6, in operation 601, a charging control device may apply a current of preset values to a battery at an initial SOC during a first charging step from 0 to $\Delta t$. The charging control device may estimate a result of applying the current using a simulation model of the battery, rather than actually applying a current to the battery.

In operation 602, the charging control device may calculate a cumulative degradation amount for each SOC. In operation 603, the charging control device may store a battery state value of the battery and the cumulative degradation amount for each SOC. Operations 602 and 603 may be performed at $\Delta t$ after the first charging step from 0 to $\Delta t$ elapses. Each SOC may correspond to each charging point of $\Delta t$, and a range of SOCs may be dependent on a range of charging current values. For example, $\Delta t$ may be one minute, and a charging current may have current values from 1 C through 1.8 C at intervals of 0.1 C therebetween. In this example, nine charging points may be defined for a time $t_1$. By applying each charging current to an ECT model, a state of the battery may be estimated through the ECT model, and the battery state value may indicate the state of the battery. The charging control device may store battery state values for respective SOCs, and then use the stored battery state values to derive a subsequent current pattern. Thus, the charging control device of one or more embodiments may maintain continuity of the battery and improve accuracy of data associated with, for example, a degradation amount and the like.

In operation 604, N may be initialized to 2 (N=2). In operation 605, the charging control device may apply the current of preset values to the battery at each SOC during an Nth charging step from $(N-1)\Delta t$ to $N\Delta t$. Currently, N is 2 (N=2), and thus the Nth charging step from $(N-1)\Delta t$ to $N\Delta t$ may be a second charging step from $\Delta t$ to $2\Delta t$. As described above, the charging control device may use the simulation model.

In operation 606, the charging control device may calculate a cumulative degradation amount of each candidate current pattern. In operation 607, the charging control device may store a battery state value corresponding to a representative current pattern and a cumulative degradation amount of the representative current pattern. Operations 606 and 607 may be performed at $2\Delta t$ after the second charging step from $\Delta t$ to $2\Delta t$ elapses. The charging control device may calculate a cumulative degradation amount of each candidate current pattern using a battery state value at each SOC that is stored in operation 603, and select a representative current pattern indicating a minimum degradation amount from among candidate current patterns. In operation 608, the charging control device may delete information of remaining current patterns excluding the representative current pattern from the candidate current patterns.

In operation 609, the charging control device may compare N and $N_F$. $N_F$ denotes a total number of charging steps. When N is less than $N_F$, the charging control device may increase N by 1 in operation 610, and perform operation 605. When N is greater than $N_F$, the charging control device may determine a reference dataset in operation 611. The charging control device may control charging in each charging step of the battery based on the reference dataset. As illustrated in FIG. 6, the charging control device may calculate an interval degradation amount while increasing N by 1. In this example, a charging interval may include one charging step. However, when a charging interval includes a plurality of charging steps, a cumulative degradation amount and a representative current pattern may be derived in a unit of two or more charging steps.

Figure 7:
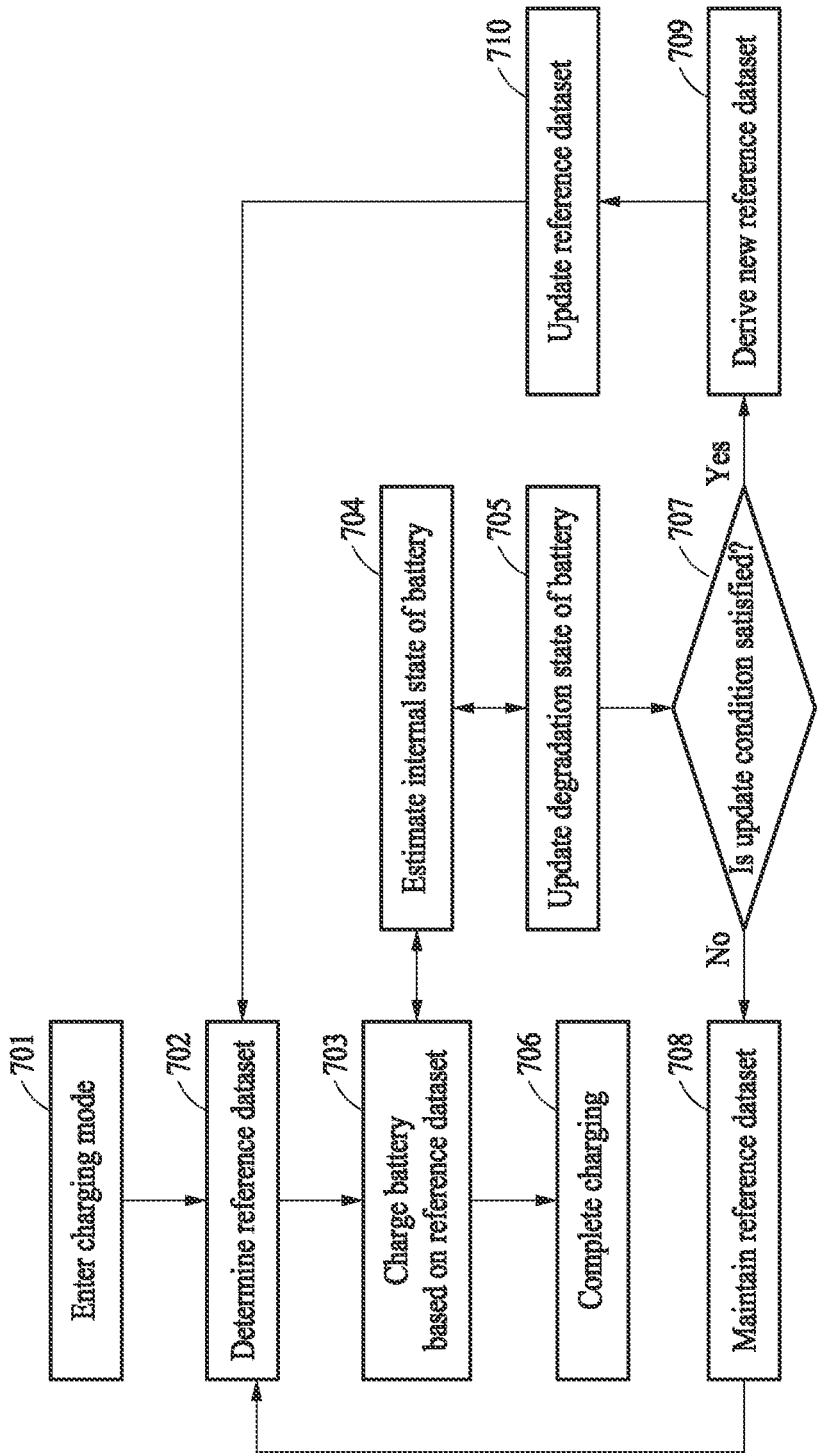
FIG. 7 illustrates an example of charging a battery by updating a battery degradation state and a reference dataset.

FIG. 7 illustrates an example of charging a battery by updating a battery degradation state and a reference dataset.

Operations 701 through 710 to be described hereinafter with reference to FIG. 7 may be performed sequentially or non-sequentially. For example, the sequence of operations 701 through 710 may be changed and/or at least two of operations 701 through 710 may be performed in parallel.

Referring to FIG. 7, in operation 701, a charging control device may enter a charging mode. For example, when a battery is connected to a wired or wireless charger, the charging control device may perform operation 701. In operation 702, the charging control device may determine a reference dataset. When the reference dataset that is generated previously is stored in a memory, the charging control device may load the reference dataset from the memory. The reference dataset may be generated through operations described above with reference to FIGS. 1 through 7. In operation 703, the charging control device may charge the battery based on the reference dataset. For example, the charging control device may control a charging current based on a charging limit condition.

In operation 704, the charging control device may estimate an internal state of the battery, and charge the battery in operation 703 based on the internal state of the battery. The charging control device may estimate the internal state of the battery using a simulation model, and control the charging current based on the reference dataset and the internal state. For example, the charging control device may estimate the internal state of the battery using an ECT model, and apply a charging current matched to each charging step to the battery while determining whether the charging limit condition of each charging step is satisfied or not.

In operation 705, the charging control device may update a degradation state of the battery. For example, the charging control device may update the simulation model based on operation data of the battery. The charging control device may define a degradation parameter indicating the degradation state of the battery based on an ECT parameter of the ECT model, and update the degradation parameter such that the degradation state of the battery is applied thereto. The degradation parameter may include, for example, a surface resistance of an anode, a capacity of a cathode active material, an electrode balance shift of the anode and the cathode, and the like. The degradation parameter may vary according to a degradation model. The charging control device may estimate the internal state based on the degradation state of the battery in operation 704. For example, the charging control device may apply the degradation state of the battery to the ECT parameter. The charging control device may update the reference dataset based on the degradation state.

In operation 707, the charging control device may determine whether a reference dataset update condition is satisfied or not. The update condition may include, for example, a condition that a state of health (SOH) decreases to be less than a threshold value, a condition that a degradation amount exceeds a threshold value, and a condition that a device usage time exceeds a threshold value. Alternatively, the reference dataset may be updated each time the degradation parameter is updated. When the update condition is satisfied, the charging control device may derive a new reference dataset in operation 709 The charging control device may derive the new reference dataset through operations described above with reference to FIGS. 1 through 7. The charging control device may then update the reference dataset to the new reference dataset in operation 710. When the update condition is not satisfied, the charging control device may maintain the reference dataset in operation 708.

The charging control device may then determine to use the reference dataset or the new reference dataset in operation 702.

Figure 8:
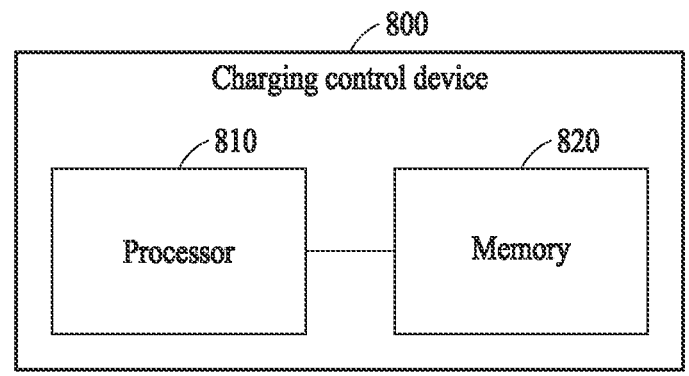
FIG. 8 illustrates an example of a charging control device.

FIG. 8 illustrates an example of a charging control device. Referring to FIG. 8, a charging control device 800 may include a processor 810 (e.g., one or more processors) and a memory 820 (e.g., one or more memories). The memory 820 may be connected to the processor 810, and store therein instructions executable by the processor 810 and data to be processed by the processor 810 or data processed by the processor 810. The memory 820 may include a non-transitory computer-readable medium, for example, a high-speed random-access memory (RAM) and/or a nonvolatile computer-readable storage medium (e.g., one or more disk storage devices, flash memory devices, or other nonvolatile solid-state memory devices).

The processor 810 may execute instructions for performing any or all of the operations described herein with reference to FIGS. 1 through 7 and 9 through 12. For example, the processor 810 may estimate step degradation amounts in respective charging steps of a first charging interval for each of first candidate current patterns of charging a battery from a first SOC level to a second SOC level during the first charging interval, determine an interval degradation amount in the first charging interval for each of the first candidate current patterns based on the estimated step degradation amounts, and select a first representative current pattern indicating a minimum degradation amount from among the first candidate current patterns based on the determined interval degradation. For a more detailed description of the charging control device 800, reference may be made to what is described herein with reference to FIGS. 1 through 7 and 9 through 12.

Figure 9:
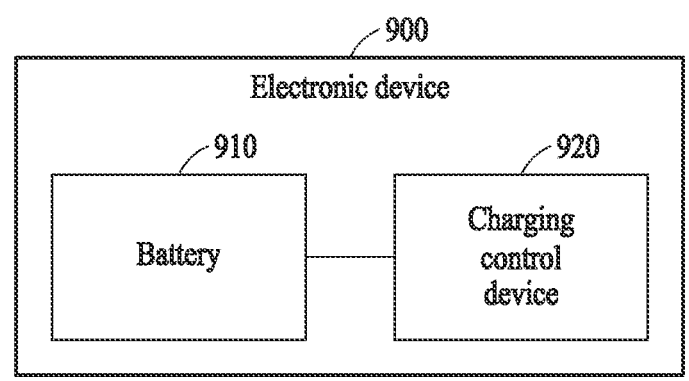
FIG. 9 illustrates an example of an electronic device including a charging control device.

FIG. 9 illustrates an example of an electronic device including a charging control device. Referring to FIG. 9, an electronic device 900 may include a battery 910 and a charging control device 920. The charging control device 920 may be provided as at least a portion of a battery management system (BMS) of the electronic device 900. The battery 910 may provide power to the electronic device 900, and the charging control device 900 may generate a reference dataset for charging the battery 910 and/or control the charging of the battery 910 based on the reference dataset.

The charging control device 920 may generate the reference dataset in an on-device manner. Alternatively, the charging control device 920 may generate the reference dataset using a server. For example, the charging control device 920 may generate the reference dataset using a resource of the server, or receive the reference dataset generated by the server. The charging control device 920 may store and/or synchronize the reference dataset, a simulation model, and the like in the server, and use the data and/or model in the server as needed. For a more detailed description of the electronic device 900, reference may be made to what is described herein with reference to FIGS. 1 through 8 and 10 through 12.

Figure 10:
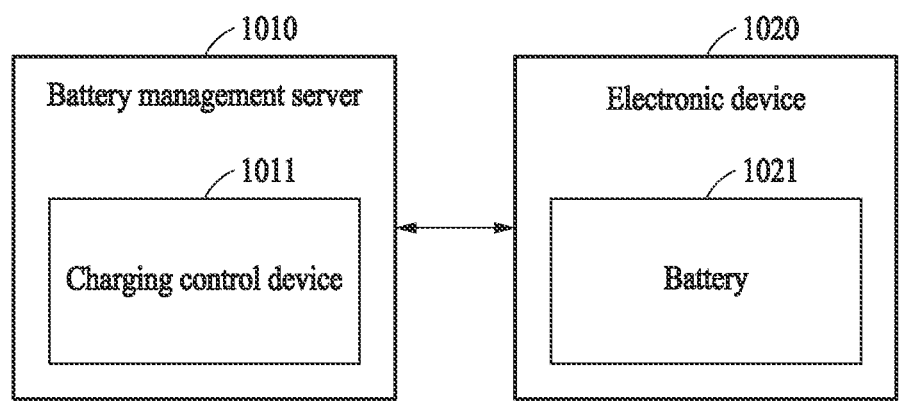
FIG. 10 illustrates an example of a battery management server including a charging control device.

FIG. 10 illustrates an example of a battery management server including a charging control device. Referring to FIG. 10, a charging control device 1011 may be included in a battery management server 1010. The charging control device 1011 may generate a reference dataset based on information associated with a battery 1021, and an electronic device 1020 may control the battery 1021 by receiving the reference dataset. In this case, the electronic device 1020 may include a separate BMS configured to control the battery 1021. Between the charging control device 1011 and the battery 1021, a communicator and the BMS may perform needed functions. The electronic device 1020 may be run by power provided by the battery 1021. For a more detailed description of the battery management server 1010 and the electronic device 1020, reference may be made to what is described herein with reference to FIGS. 1 through 9, 11, and 12.

Figure 11:
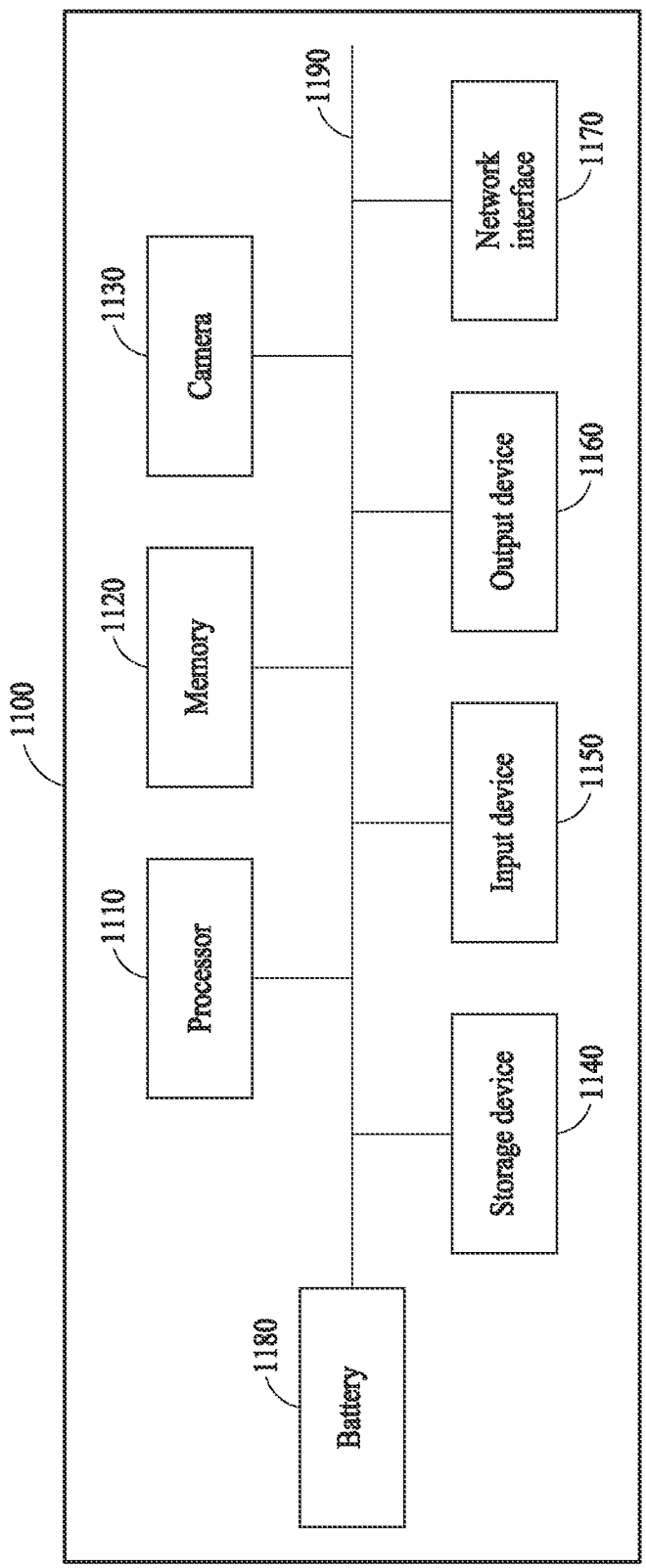
FIG. 11 illustrates an example of an electronic device including various components.

FIG. 11 illustrates an example of an electronic device including various components. Referring to FIG. 11, an electronic device 1100 may include a processor 1110 (e.g., one or more processors), a memory 1120 (e.g., one or more memories), a camera 1130, a storage device 1140, an input device 1150, an output device 1160, a network interface 1170, and a battery 1180, which may communicate with one another through a communication bus 1190. For example, the electronic device 1100 may be provided as at least a portion of a mobile device (e.g., a mobile phone, a smartphone, a personal digital assistant (PDA), a netbook, a tablet computer, a laptop computer, etc.), a wearable device (e.g., a smart watch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), and a vehicle (e.g., an autonomous vehicle, a smart vehicle, etc.). The electronic device 1100 may structurally and/or functionally include the charging control device 110 of FIG. 1, the charging control device 800 of FIG. 8, the electronic device 900 of FIG. 9, the battery management server 1010 of FIG. 10, and/or the electronic device 1020 of FIG. 10.

The processor 1110 may execute functions and instructions in the electronic device 1100. The processor 1110 may process instructions stored in the memory 1120 or the storage device 1140. The processor 1110 may perform the operations described herein with reference to FIGS. 1 through 10, and 12. The memory 1120 may store data for controlling charging of the battery 1180. The memory 1120 may include a computer-readable storage medium or a computer-readable storage device. The memory 1120 may store instructions to be executed by the processor 1110, and related information while software and/or application is being executed by the processor 1100.

The camera 1130 may capture an image and/or a video. The camera 1130 may be a three-dimensional (3D) camera including depth information of objects. The storage device 1140 may include a computer-readable storage medium or a computer-readable storage device. The storage device 1140 may store a greater amount of information than the memory 1120 and store the information for a long period of time. The storage device 1140 may include, for example, a magnetic hard disk, an optical disc, a flash memory, a floppy disc, or a nonvolatile memory of other types known in relevant technical fields.

The input device 1150 may receive an input from a user through a traditional input method using a keyboard and a mouse or through a new input method using a touch input, a voice input, and an image input. The input device 1150 may include, for example, a keyboard, a mouse, a touchscreen, a microphone, or any other device that may detect an input from a user and transfer the detected input to the electronic device 1100. The output device 1160 may provide an output of the electronic device 1100 to a user through a visual, auditory, or tactile channel. The output device 1160 may include, for example, a display, a touchscreen, a speaker, a vibration generator, or any other device that may provide an output of the electronic device 1110 to a user. The network interface 1170 may communicate with an external device through a wired or wireless network. The battery 1180 may be a secondary battery such as a lithium-ion battery. For a more detailed description of the electronic device 1100, reference may be made to what is described herein with reference to FIGS. 1 through 10, and 12.

Figure 12:
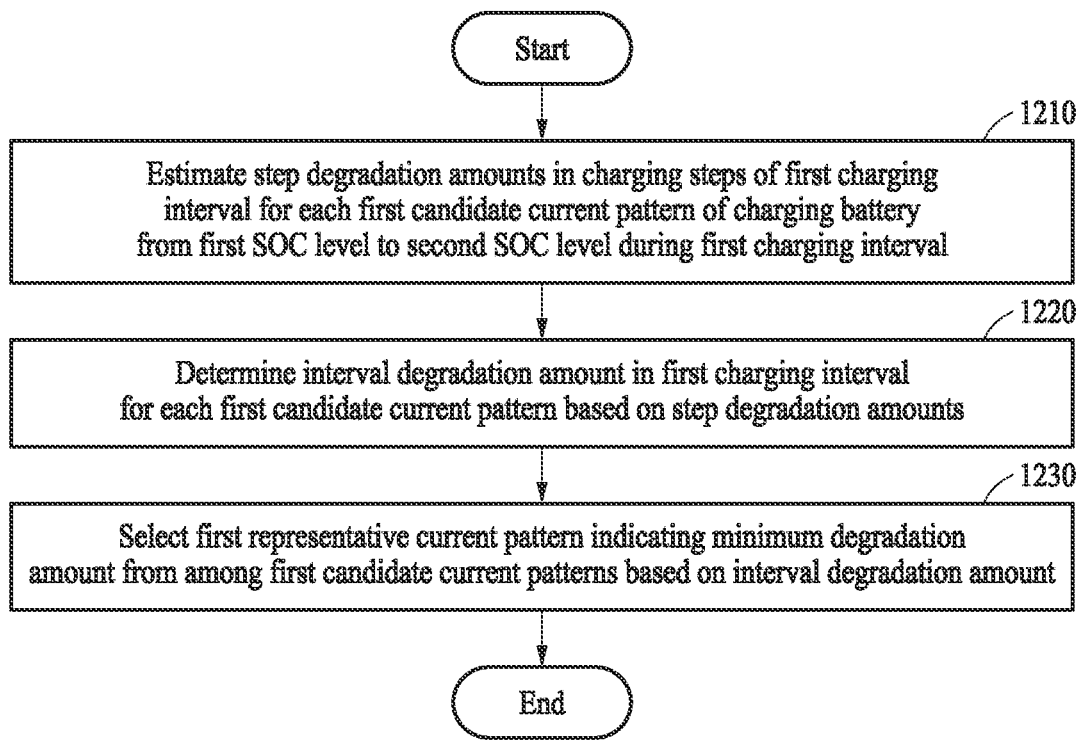
FIG. 12 illustrates an example of a charging control method.

FIG. 12 illustrates an example of a charging control method. Operations 1210 through 1230 to be described hereinafter with reference to FIG. 12 may be performed sequentially or non-sequentially. For example, the sequence of operations 1210 through 1230 may be changed and/or at least two of operations 1210 through 1230 may be performed in parallel.

Referring to FIG. 12, in operation 1210, a charging control device may estimate step degradation amounts in respective charging steps of a first charging interval for each of first candidate current patterns of charging a battery from a first SOC level to a second SOC level during the first charging interval. The first candidate current patterns may correspond to different combinations of charging current values for the charging steps of the first charging interval.

In operation 1220, the charging control device may determine an interval degradation amount in the first charging interval for each of the first candidate current patterns based on the step degradation amounts. Operation 1210 may include estimating the step degradation amounts in the charging steps for each of the first candidate current patterns using a simulation model of the battery. Operation 1220 may include determining the interval degradation amount of each of the first candidate current patterns by accumulating the step degradation amounts of each of the first candidate current patterns along the first charging interval. The simulation model may be, for example, an ECT model.

For example, the first charging interval may include a first charging step and a second charging step, and the first candidate current patterns may include a first pattern of applying a first current value during the first charging step and applying a second current value during the second charging step. In this example, operation 1210 may include estimating a first step degradation amount of the first pattern based on the first current value, and estimating a second step degradation amount of the first pattern based on the second current value. In this example, operation 1220 may include determining a first interval degradation amount of the first pattern by accumulating the first step degradation amount and the second step degradation amount.

In operation 1230, the charging control device may select a first representative current pattern indicating a minimum degradation amount from among the first candidate current patterns based on the interval degradation amount. The charging control device may remove data associated with remaining current patterns excluding the first representative current pattern from the first candidate current patterns.

The charging control device may select a second representative current pattern of charging the battery from the second SOC level to a third SOC level during a second charging interval based on the first representative current pattern. The charging control device may use a state value of the battery that is based on the first representative current pattern to determine second candidate current patterns in the second charging interval and determine an interval degradation amount of each of the second candidate current patterns. When determining the second candidate current patterns, the charging control device may exclude the remaining current patterns excluding the first representative current pattern from the first candidate current patterns.

The charging control device may estimate the step degradation amounts in the charging steps for each of the first candidate current patterns using the simulation model of the battery, and update the simulation model based on a degradation state of the battery. The charging control device may determine a reference dataset based on the first representative current pattern, and control charging of the battery in each of the charging steps based on the reference dataset. The charging control device may estimate an internal state of the battery using the simulation model, and control a charging current based on the reference dataset and the internal state. The charging control device may update the simulation model and the reference dataset based on the degradation state of the battery. For a more detailed description of the charging control method, reference may be made to what is described above with reference to FIGS. 1 through 12.

The charging control devices, batteries, processors, memories, electronic devices, battery management servers, cameras, storage devices, input devices, output devices, network interfaces, charging control device 110, battery 120, charging control device 800, processor 810, memory 820, electronic device 900, battery 910, charging control device 920, battery management server 1010, charging control device 1011, electronic device 1020, battery 1021, electronic device 1100, processor 1110, memory 1120, camera 1130, storage device 1140, input device 1150, output device 1160, network interface 1170, battery 1180, communication bus 1190, and other devices, apparatuses, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with charging control, comprising:
    estimating respective step degradation amounts in charging steps of a first charging interval for each of first candidate current patterns of charging a battery from a first state of charge (SOC) level to a second SOC level during the first charging interval;
    determining an interval degradation amount in the first charging interval for each of the first candidate current patterns, based on the estimated step degradation amounts; and
    selecting a first representative current pattern indicating a minimum degradation amount from among the first candidate current patterns, based on the determined interval degradation amounts.

2. The method of claim 1, wherein the first candidate current patterns correspond to different combinations of charging current values respectively for the charging steps of the first charging interval.

3. The method of claim 1, wherein
    the estimating of the step degradation amounts comprises estimating the step degradation amounts in the charging steps for each of the first candidate current patterns using a simulation model of the battery, and
    the determining of the interval degradation amounts comprises determining an interval degradation amount of each of the first candidate current patterns by accumulating the step degradation amounts of each of the first candidate current patterns in the first charging interval.

4. The method of claim 3, wherein
    the first charging interval comprises a first charging step and a second charging step, and
    the first candidate current patterns comprise a first pattern of applying a first current value during the first charging step and applying a second current value during the second charging step.

5. The method of claim 4, wherein
    the estimating of the step degradation amounts comprises:
    estimating a first step degradation amount of the first pattern based on the first current value; and
    estimating a second step degradation amount of the first pattern based on the second current value, and
    the determining of the interval degradation amounts comprises determining a first interval degradation amount of the first pattern by accumulating the first step degradation amount and the second degradation amount.

6. The method of claim 3, wherein the simulation model is an electrochemical model.

7. The method of claim 1, further comprising removing data associated with remaining current patterns excluding the first representative current pattern from among the first candidate current patterns.

8. The method of claim 1, further comprising selecting a second representative current pattern of charging the battery from the second SOC level to a third SOC level during a second charging interval, based on the first representative current pattern.

9. The method of claim 8, wherein a battery state value that is based on the first representative current pattern is used to determine second candidate current patterns for the second charging interval and determine an interval degradation amount of each of the second candidate current patterns.

10. The method of claim 9, wherein, in the determining of the second candidate current patterns, remaining first current patterns excluding the first representative current pattern from among the first candidate current patterns are excluded.

11. The method of claim 1, wherein
    the step degradation amounts in the charging steps for each of the first candidate current patterns are estimated using a simulation model of the battery, and
    the simulation model is updated based on a degradation state of the battery.

12. The method of claim 1, further comprising:
    determining a reference dataset based on the first representative current pattern; and
    controlling charging in each charging step for the battery based on the determined reference dataset.

13. The method of claim 12, wherein the controlling of the charging comprises:
    estimating an internal state of the battery using a simulation model of the battery; and
    controlling a charging current based on the reference dataset and the internal state.

14. The method of claim 13, further comprising updating the reference dataset based on a degradation state of the battery.

15. A non-transitory computer-readable storage medium storing instructions that, when executed by a processor, configure the processor to perform the method of claim 1.

16. A device with charging control, comprising:
    a processor configured to:
    estimate respective step degradation amounts in charging steps of a first charging interval for each of first candidate current patterns of charging a battery from a first state of charge (SOC) level to a second SOC level during the first charging interval;
    determine an interval degradation amount in the first charging interval for each of the first candidate current patterns, based on the estimated step degradation amounts; and
    select a first representative current pattern indicating a minimum degradation amount from among the first candidate current patterns, based on the determined interval degradation amounts.

17. The device of claim 16, wherein the first candidate current patterns correspond to different combinations of charging current values respectively for the charging steps of the first charging interval.

18. The device of claim 16, wherein the processor is configured to:
for the estimating of the step degradation amounts, estimate the step degradation amounts in the charging steps for each of the first candidate current patterns, using a simulation model of the battery; and
for the determining of the interval degradation amounts, determine the interval degradation amount of each of the first candidate current patterns by accumulating the step degradation amounts of each of the first candidate current patterns in the first charging interval.

19. The device of claim 16, wherein
the processor is configured to select a second representative current pattern of charging the battery from the second SOC level to a third SOC level during a second charging interval, based on the first representative current pattern, and
a battery state value that is based on the first representative current pattern is used to determine second candidate current patterns for the second charging interval and determine an interval degradation amount of each of the second candidate current patterns.

20. The device of claim 19, wherein, in the determining of the second candidate current patterns, remaining current patterns excluding the first representative current pattern from among the first candidate current patterns are excluded.

21. The device of claim 16, further comprising a memory storing instructions that, when executed by the processor, configure the processor to perform the estimating of the respective step degradation amounts, the determining of the interval degradation amount, and the selecting of the first representative current pattern.

22. A processor-implemented method with charging control, comprising:
estimating, for charging a battery from a first state of charge (SOC) to a second SOC over a first charging interval, battery degradation amounts each corresponding to a respective candidate current pattern;
determining, as a current pattern of the first interval, one of the candidate current patterns corresponding to a minimum of the battery degradation amounts; and
determining, for charging the battery from the first SOC to a third SOC over a plurality of charging intervals including the first interval, a final current pattern to include the determined current pattern of the first interval.

23. The method of claim 22, wherein the determining of the final current pattern comprises estimating a current pattern of a subsequent charging interval based on the determined current pattern of the first interval.

24. The method of claim 22, wherein the determining of the current pattern of the first interval comprises deleting the candidate current patterns from a memory except for the determined current pattern of the first interval.

25. The method of claim 22, wherein each of the current patterns for the first charging interval is a pattern of charging the battery based on two or more charging currents over the first charging interval.

26. The method of claim 25, wherein
the first charging interval includes a plurality of charging steps, and
two or more of the candidate current patterns include different charging currents for one or more of the charging steps.

27. The method of claim 22, further comprising charging the battery based on the final charging current pattern.

* * * * *